3,118,822
PROCESS FOR CYCLOPENTANOPHENANTHRENE DERIVATIVES
Carlos Casas-Campillo, Mexico City, Mexico, assignor, by mesne assignments, to Syntex Corporation, a corporation of Panama
No Drawing. Filed Sept. 19, 1961, Ser. No. 139,069
Claims priority, application Mexico Oct. 24, 1960
4 Claims. (Cl. 195—51)

The present invention relates to a new process for preparing certain cyclopentanoperhydrophenanthrene derivatives.

More specifically, it relates to a method for introducing a hydroxyl group at C–11α of steroidal compounds, by incubation with microorganisms of the Agaricaceae family, as will be hereinafter described in detail.

This method allows the conversion of androstane and pregnane derivatives into the 11α-hydroxylated derivatives. As it is known, such compounds are by themselves therapeutic agents, or intermediates for the manufacture of other compounds of therapeutic value, since upon oxidation they produce the corresponding 11-ketones. On the other hand, the 11α-hydroxy steroids obtained in accordance with the present invention may be converted by known methods into the 9α-halo-11β-hydroxy derivatives, as well as into 9α-halo-11-keto compounds.

Several microorganisms, specially those belonging to the Rhizopus genus, may effect the introduction of an 11α-hydroxyl group in the steroidal molecule; however, sometimes the yields obtained are not very high, and furthermore hydroxylation may also occur at other positions, such as at C–6.

In accordance with the present invention, it has been found that microorganisms of the Agaricaceae family of the Psilocybe, Stropharia and Conocybe genera are capable of introducing an 11α-hydroxyl group into compounds of the androstane and pregnane series in very high yields and without causing simultaneous hydroxylation at other positions of the steroidal molecule; the conditions under which the reaction is effected afford products which are easily isolated in a high degree of purity.

As it has been set forth above, the method object of the present invention may be employed for the 11α-hydroxylation of a great variety of steroids having no substituent at C–11. Several types of side chain may be present at position 17, as well as other substituents such as keto groups, hydroxyl groups, free or esterified, halogen, methyl, etc. The starting compounds may be saturated or unsaturated at C–4,5 or C–5,6.

Besides the free compounds, there may be used as substrates the acetates or other esters, but in some cases the yields obtained are lower.

The method may be applied with good results for the introduction of an 11α-hydroxyl group using as substrates androstenedione, testosterone, pregnenolone, 17α-hydroxyprogesterone, desoxycorticosterone, Reichstein's Compound "S," as well as derivatives of the aforementioned compounds substituted at other positions, such as for example 6-halo, 16α or 16β-methyl-16α-hydroxy or 16α,17-acetonides.

In particular the present invention relates to the conversion of Reichstein's Compound "S," 6α-fluoro-"S," 6α-fluoro-16α-methyl-"S," 16α-hydroxy-"S," the 16α,17α-acetonide of "S" and the 1-dehydro analogs of such compounds, into the corresponding 11α-hydroxy derivatives, which in turn, by known methods, produce the 11-keto and 9α-fluoro-11β-hydroxy compounds, which are potent anti-inflammatory agents.

As already mentioned, there are employed for the 11α-hydroxylation microorganisms of the Agaricales order, of the Agaricaceae family, belonging to the Psilocybe, Stropharia and Conocybe genera. Of particular importance are the strains of the *P. caerulescens, P. mexicana, S. cubensis* and *C. siligineoides* species; other species which may be employed in our method are the following: *P. subaeruginascens, P. aeroginomaculans, P. collobioides, P. strictipes, P. baeocystis, P. aggericola, P. candidipes, P. zapotecorum, P. muliercula, P. caerulipes, P. semperviva, P. nigripes, P. acutissima, P. hoogshanegi, P. cordispora, P. mixaeensis, P. yungensis, P. wassonii, S. venenata* and *S. fallaciosa, P. silvatica, P. pelliculosa, P. aztecorum,* and *P. cyanescens.*

These microorganisms have been described and morphologically characterized by R. Heim et al. in "Les champignons hallucinogenes du Mexique," Paris (1958), by R. Singer in Mycologia, L:239–261 (1958), and by R. Singer and A. H. Smith in Mycologia, L:262–303 (1958).

The yields obtained by the method described in the present invention vary according to the starting compound, the strain of microorganism employed, etc.

The process of the present invention may be carried out by incubating the microorganism in an adequate medium containing carbohydrates, salts and sources of organic nitrogen.

As nitrogen source, there may be employed soya flour, corn flour or commercial products such as Casitone, Edamine, yeast extract, Phytone (papaic digest of soya meal, Baltimore Biol. Lab., Baltimore, Md.), Mycophil, nutrient L–1 (Lactalbumin hydrolyzate, Sheffield Farms, Norwich, N.Y.), or NZ-amine (pancreatic hydrolyzate of caseine, Baltimore Biol. Lab., Baltimore, Md.).

In practice the steroid is added under sterile conditions, either in crystalline form or in solution in an adequate solvent such as acetone or ethanol for example, to a culture of the microorganism; the mixture is then stirred in the presence of air in order to facilitate the growth of the microorganism and the oxygenation of the substrate. Alternatively, the culture medium may be seeded under sterile conditions with a culture of the microorganism and simultaneously, or when the growth of the organism has been initiated, adding the steroid. In some cases it is advisable to add the steroid when the microorganism has completed its growth.

There may also be employed enzymatic preparation of the growth of the oxygenating microorganism.

The method which affords best results is that in which the microorganism is previously developed in an adequate culture medium, under aerobic conditions, in the absence of the steroid; the growth obtained is separated from the medium by filtration and if desired it is washed with distilled water. The mycelium thus obtained is then suspended in water to which the steroid to be hydroxylated had been previously added, and the mixture is stirred under aeration for a period of time fluctuating between 12 and 78 hours; at the end of this time the reaction products are isolated by extraction with an adequate solvent.

In general, it is recommended a steroid concentration of 5% by weight of the total weight of the substrate, although other concentrations may be employed. Taking into account that the solubility in water of the steroidal compounds is very low, the oxygenation in some cases is very slow; however, the degree of subdivision of the steroid when added to the oxygenating system, either a culture of the microorganism or an enzymatic system, does not seem to have any effect upon the yield or the nature of the products.

When a solution of the steroid in a solvent miscible with water is added to an aqueous fermentation system, in the presence of a great excess of water, the steroid usually precipitates in a very fine form; however, this method does not seem to favor appreciably the speed of the reaction as compared with the addition of crystals of the steroid, of relatively larger size.

When the oxygenation process is complete, the product may be recovered from the mixture by extraction with a solvent non miscible with water; adequate solvents for this purpose are: chlorinated hydrocarbons, alcohols and ketones, such as for example chloroform, methylene chloride, trichloro ethane, ethylene chloride, etc.; in particular, there are obtained good results when the extraction of the product is effected with ethylene chloride in the hot, at a temperature between 40 and 80°; the extract containing the reaction product and recovered starting material may be reduced to a small volume or evaporated to dryness, thus obtaining a solid product which is purified by different methods, the most common being chromatography and crystallization.

The following examples illustrate the method but do not restrict the scope of the invention:

*Example I*

A culture of *Psilocybe caerulescens* var. *mazatecorum* (Heim) ATCC 13964 was maintained by serial transferences every 2 weeks, in a medium of mycophil-agar or malta-agar, incubating at a temperature between 25 and 28° C.

The growth obtained in inclined agar tube was suspended in 5 cc. of sterile water. 1 cc. of this suspension was employed to inoculate a series of 20 Erlenmeyer flasks containing 25 cc. of the following culture medium:

| | | |
|---|---|---|
| Soya flour or corn flour | g | 10.00 |
| Corn syrup | g | 20.00 |
| $K_2HPO_4$ | g | 1.0 |
| KCl | g | 0.5 |
| $MgSO_4 \cdot 7H_2O$ | g | 0.5 |
| $FeSO_4 \cdot 7H_2O$ | | Traces |
| Distilled water | cc | 1000 |

The cultures were incubated with rotatory stirring (250 r.p.m.) at 25–28° C. for 3 to 5 days, until an abundant growth was obtained, which was dispersed in a blendor. 5 cc. of the microbial suspension thus obtained were added to each of eighty 125 cc. Erlenmeyer flasks containing 25 cc. of the culture medium, incubating for 72 hours under the same conditions (at 25–28° C. and with stirring).

To each flask was added 5 mg. of Compound "S" (0.2 cc. of a 2.5% ethanolic solution) and then stirred with aeration for 72 hours, at the end of which the contents of the flasks were extracted several times with methylene chloride; the extract was washed with water, dried over anhydrous sodium sulfate and evaporated to dryness under reduced pressure. The residue was adsorbed in a column of 12 g. of silica gel and 12 g. of celite, previously washed with methylene chloride-acetone (80:20); there was thus obtained 150 mg. of $\Delta^4$-pregnene-$11\alpha,17\alpha,21$-triol-3,20-dione, identical with an authentic sample of 11-epi-"F."

*Example II*

In the preceding example, there was substituted in the culture medium the soya flour by Casitone (caseine hydrolyzate), also obtaining as final product 11-epi-hydrocortisone.

*Example III*

In accordance with the method described in Example I, there were converted $16\alpha$-methyl-$\Delta^4$-pregnene-$17\alpha,21$-diol-3,20-dione into $16\alpha$-methyl-$\Delta^4$-pregnene-$11\alpha,17\alpha,21$-triol-3,20-dione; $6\alpha$-fluoro-$16\alpha$-methyl-$\Delta^4$-pregnene-$17\alpha,21$-diol-3,20-dione into $6\alpha$-fluoro-$16\alpha$-methyl-$\Delta^4$-pregnene-$11\alpha,17\alpha,21$-triol-3,20-dione; and $6\alpha$-fluoro-$\Delta^4$-pregnene-$16\alpha,17\alpha,21$-triol-3,20-dione into $6\alpha$-fluoro-$\Delta^4$-pregnene-$11\alpha,16\alpha,17\alpha,21$-tetrol-3,20-dione.

*Example IV*

By essentially following the method described in Example I, but substituting the soya flour by Edamine (lactalbumine hydrolyzate), there was incubated 500 mg. of the 16,17-acetonide of Reichstein's Compound "S," thus obtaining 150 mg. of $16\alpha,17\alpha$-isopropylidenedioxy-$\Delta^4$-pregnene-$11\alpha,21$-diol-3,20-dione.

*Example V*

There was prepared a vegetating growth of *Stropharia cubensis* (Earle) ATCC 13966 in the same medium described in Example I, under aeration; to culture thus obtained there was added a 2% ethanol solution of $6\alpha$-fluoro-"S," adding 10 mg. of the latter to 50 cc. of the culture. The mixture was stirred at 28° C. under aeration for 60 hours, then extracted several times with the ethylene chloride and the extract was washed with water, dried over anhydrous sodium sulfate, filtered and evaporated to dryness under vacuum. The residue was purified by chromatography on silica gel. There was thus obtained $6\alpha$-fluoro-11-epi-hydrocortisone.

*Example VI*

There was prepared a vegetating growth of *Conocybe siligineoides* in a culture medium prepared in accordance with Example I, but using Mycophil (soya protein hydrolyzate) instead of soya flour; to the culture thus obtained was added a 2.5% ethanolic solution of Reichstein's compound "S," using 5 mg. of the steroid for each 25 cc. of culture. After stirring at 28° C. under aeration for 72 hours, the product was extracted with methylene chloride and the extract was washed with water, dried over anhydrous sodium sulfate and evaporated to dryness under vacuum.

By chromatography of the residue, there was obtained 11-epi-hydrocortisone, identical with the compound obtained in Example I.

*Example VII*

There was prepared a vegetating growth of *Psilocybe mexicana* (Heim) ATCC 13965 in the medium described in Example IV, under aeration; to the culture thus obtained was added a 2% ethanolic solution of $16\alpha$-methyl-$\Delta^4$-pregene-$17\alpha,21$-diol-3,20-dione, adding 10 mg. of the steroid to each 50 cc. of culture. The mixture was stirred at 25–28° C. under aeration for 72 hours, extracted several times with ethylene chloride and the extract was washed with water, dried over anhydrous sodium sulfate and evaporated to dryness under reduced pressure. Chromatography of the residue on silica gel furnished $16\alpha$-methyl-$\Delta^4$-pregnene-$11\alpha,17\alpha,21$-triol-3,20-dione, identical with the compound obtained in Example III.

I claim:

1. A process for the production of an $11\alpha$-hydroxylated steroid comprising subjecting a steroid selected from the group consisting of 11-desoxy androstane series and 11-desoxy pregnane series to he oxygenating action of enzymes produced by a microorganism of the family Agaricaceae of the genera selected from the group consisting of Psilocybe, Conocybe and Stropharia.

2. The process of claim 1 wherein the microorganism of the family Agaricaceae is of the genus Psilocybe.

3. The process of claim 1 wherein the microorganism of the family Agaricaceae is of the genus Conocybe.

4 The process of claim 1 wherein the microorganism of the family Agaricaceae is of the genus Stropharia.

References Cited in the file of this patent

UNITED STATES PATENTS 2,966,444     Hasegawa     Dec. 27, 1960

UNITED STATES PATENT OFFICE
CERTIFICATE OF CORRECTION

Patent No. 3,118,822                      January 21, 1964

Carlos Casas-Campillo

It is hereby certified that error appears in the above numbered patent requiring correction and that the said Letters Patent should read as corrected below.

Column 4, line 57, for "he" read -- the --.

Signed and sealed this 9th day of June 1964.

(SEAL)
Attest:

ERNEST W. SWIDER                        EDWARD J. BRENNER
Attesting Officer                           Commissioner of Patents